Sept. 17, 1935. L. E. A. BOURN Re. 19,702

ELECTRICAL MUSICAL INSTRUMENT

Original Filed Feb. 24, 1934 3 Sheets-Sheet 1

Inventor
Leslie Edwin Alexander Bourn
By J. S. Wooster
Attorney

ELECTRICAL MUSICAL INSTRUMENT

Original Filed Feb. 24, 1934 3 Sheets-Sheet 2

Inventor
Leslie Edwin Alexander Bourn,
By J. S. Wooster
Attorney

ELECTRICAL MUSICAL INSTRUMENT

Original Filed Feb. 24, 1934 3 Sheets-Sheet 3

Leslie E. A. Bourn
J. Montes
atty.

Reissued Sept. 17, 1935

Re. 19,702

UNITED STATES PATENT OFFICE 19,702

ELECTRICAL MUSICAL INSTRUMENT

Leslie Edwin Alexander Bourn, Ashford, England

Original No. 1,996,669, dated April 2, 1935, Serial No. 712,724, February 24, 1934. Application for reissue July 13, 1935, Serial No. 32,660

8 Claims. (Cl. 84—1)

This invention relates to electrical musical instruments and has for its object the provision of an improved musical instrument which, while being without organ pipes, will in general fulfil the function of an organ, or any other musical instrument.

The invention consists broadly in the arrangement that each note is produced by an undulating potential electrostatically induced in a secondary element by relative movement between said secondary element and a primary element which is charged, one of said elements being of undulating formation.

In order that the invention may be the more clearly understood an electric organ in accordance therewith will now be described, reference being made to the accompanying drawings wherein:—

Fig. 5 is a sectional view of the electrically secondary element 4 of Fig. 4.

Figure 1:
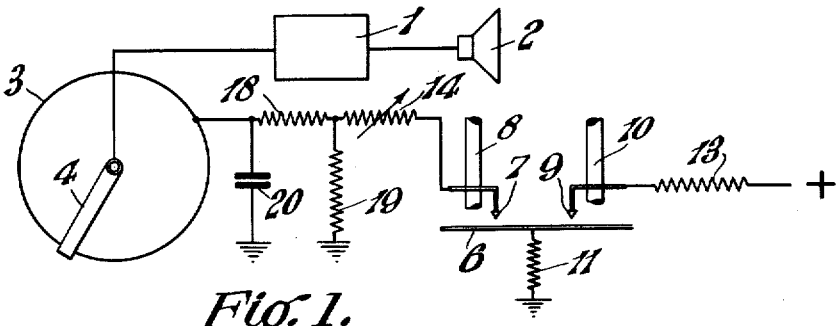
Figure 1 is a fundamental diagram of connections illustrating the manner of generation of each individual partial note.

In this organ each individual note is produced by the application of an undulating potential of the required frequency to a common amplifier 1 which supplies a loud speaker 2 (Figure 1).

This undulating potential is generated by means of a generator consisting of a ring 3 of conducting material having an undulating form as will hereinafter appear and an electrode 4 which revolves about the axis of said ring keeping close thereto. This electrode 4 is connected to the said amplifier 1 and when the ring is connected to a source of potential an undulating potential will be electrostatically induced on the electrode 4 of a frequency depending on the speed of rotation of said electrode and the distance apart of the undulations of the ring 3. This undulating potential will be applied to the amplifier 1 and a musical note, whose pitch depends on the said frequency and whose intensity depends on the potential to which the ring was raised, will be emitted from the loud speaker 2.

The source of potential may be any suitable source and the connection of said ring 3 to said source is through the medium of a bus bar 6 adapted to be connected to the ring 3 by means of a contact 7 on a key 8 and adapted to be connected to said source by means of a contact 9 on a stop 10.

In the instrument being described by way of example we will suppose there are seventy two keys, that is to say the keys for six octaves of each of the twelve notes of the tempered scale. Each of the octaves in the arrangement being described is capable of being produced with eight partials though in practice this number would probably be increased.

In practice the rings 3 for the partials of all six octaves of each note are included in one set so that there are in all twelve sets of rings 3 each set having associated with it six keys 8.

Figure 4:
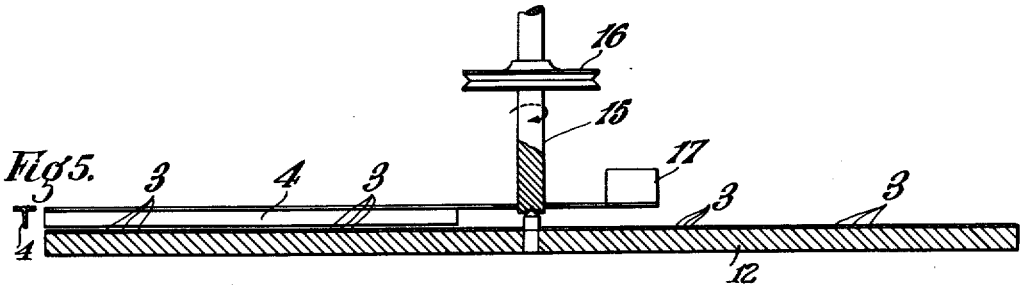
Fig. 4 illustrates in cross section the structure of a generator unit comprising the generators for six octaves of a given note together with their partials.

The rings 3 of each set are co-planar and concentric with one another, being mounted on a common insulating disc 12 (Figure 4). A common electrode 4 serves for each set and takes the form of a radial arm rotating about the axis of the set and passing over the surfaces of all the rings. In certain cases different partials of different octaves are of the same pitch but it is preferable to provide a ring proper to each partial in every case so that the total number of rings in each set is six times eight or forty eight, the eight partials of the lowest octave being generated by the first eight rings, that of the next lowest octave by the next eight rings and so on.

In practice each set of generators is made identical and the whole tempered musical scale is covered by rotating the successive electrode arms 4 of each set at a speed of $$12\sqrt{2}$$

times that of the preceding.

Figure 2:
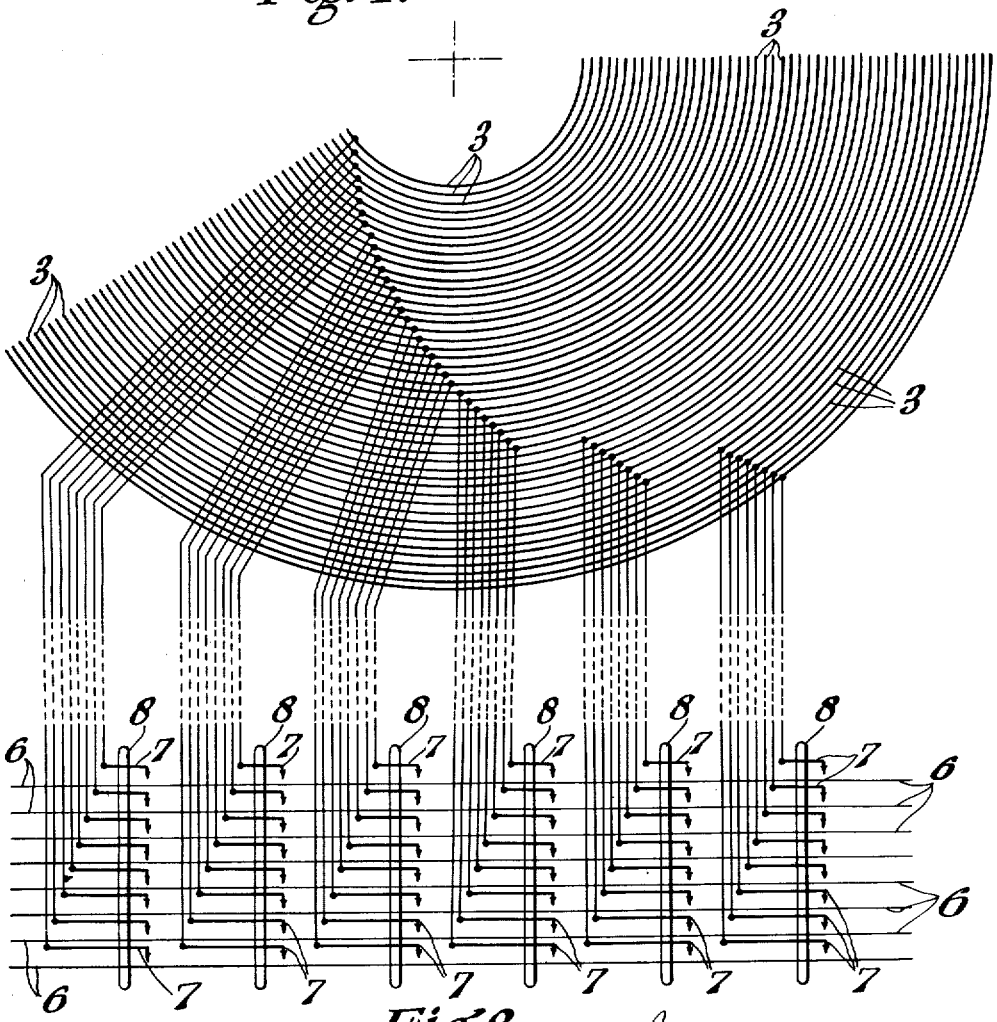
Figure 2 illustrates the correlation between the generators for six octaves of a given note (together with their partials), and the six corresponding keys of the keyboard.

Each of the six keys 8 associated with each set of rings is provided with eight contacts 7 for the eight partials of the octave represented by that particular key, each contact 7 being connected to the appropriate ring as illustrated in Figure 2.

Eight of the bus bars 6 are provided which are common throughout the whole scale and it will be seen from Figure 2 that when any key 8 is depressed all of its contacts 7 will be connected to respective bus bars, the first to the first bus bar, the second to the second bus bar and so on.

Thus the note appertaining to that key will be produced in a quality which depends upon which of the eight bus bars are energized.

Figure 3:
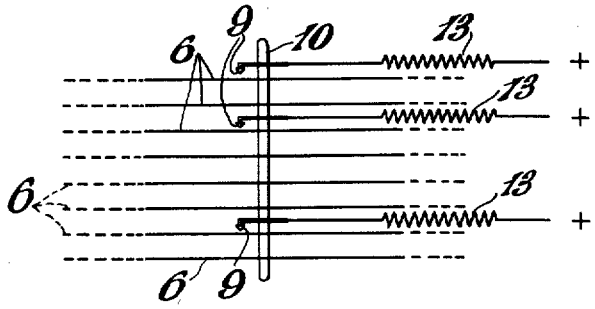
Figure 3 illustrates the operation of the stops for predetermining the quality of the notes.

The energization of the bus bars is controlled by the stops 10. Each of the stops 10 has a number of the contacts 9 each connected to the source of potential, which contacts 9 when the stop is drawn, engage with, and effect energization of, selected ones of the bus bars 6 according to the quality of notes which it is required to be produced by the keys. A stop 10 is illustrated by way of example in Figure 3 which upon depression effects energization of the first, third and seventh of the bus bars 6 so that when this stop is drawn the subsequent depression of each key 8 will sound the first third and seventh partial of the note appertaining to that key.

Each bus bar 6 is permanently connected to earth through a resistance 11 to say 100,000 ohms and its connection to the source of potential by each contact 9 is through an independent path including a resistance 13 of the same order. Thus when the bus bar 6 is energized through two different contacts 9 simultaneously, owing to two different stops 10 being simultaneously actuated, its potential will be higher than if it were energized through only one of said contacts and thus the correct additive effect will be obtained.

Each contact 7 is connected to its proper ring 3 through an adjustable resistance 14 and a leak 18 of say 20 megohms in series, a leak 19 of say 5 megohms extending to earth from a point between said resistance 18 and leak 14, and a condenser 20 being connected between the earth and the ring 3. The adjustable resistance 14 is adjusted once and for all after the whole apparatus is assembled until the correct sound intensity is generated from that particular ring 3. The purpose of the condenser 20 is that of causing the potential of the ring 3 to build up slowly when the contact 7 engages the bus bar 6 thereby preventing a sharp sound from being generated immediately contact is established.

Figure 4 illustrates the structional details of one of the generator units showing the forty-eight rings 3 mounted on the insulating disc 12, and the common arm 4 rotatable about the axis of said rings. As shown said arm 4 is mounted on a spindle 15 carrying a driving pulley 16, a counter weight 17 being provided for counter-balancing the weight of said arm. As shown said arm 4 is of T section presenting a relatively sharp edge to the rings 3.

In practice the rings 3 are constituted by first proving the insulating disc 12 with a coating of graphite, then dividing this coating into rings by means of concentric circular cuts $C^1$ (Fig. 6), and finally dividing each such ring into a pair of rings by means of a longitdinal sine wave cut $C^2$ of the required wave length. Of the pair of rings thus produced one is earthed, as an alternative to its being removed. The other constitutes the ring 3.

Figure 6:
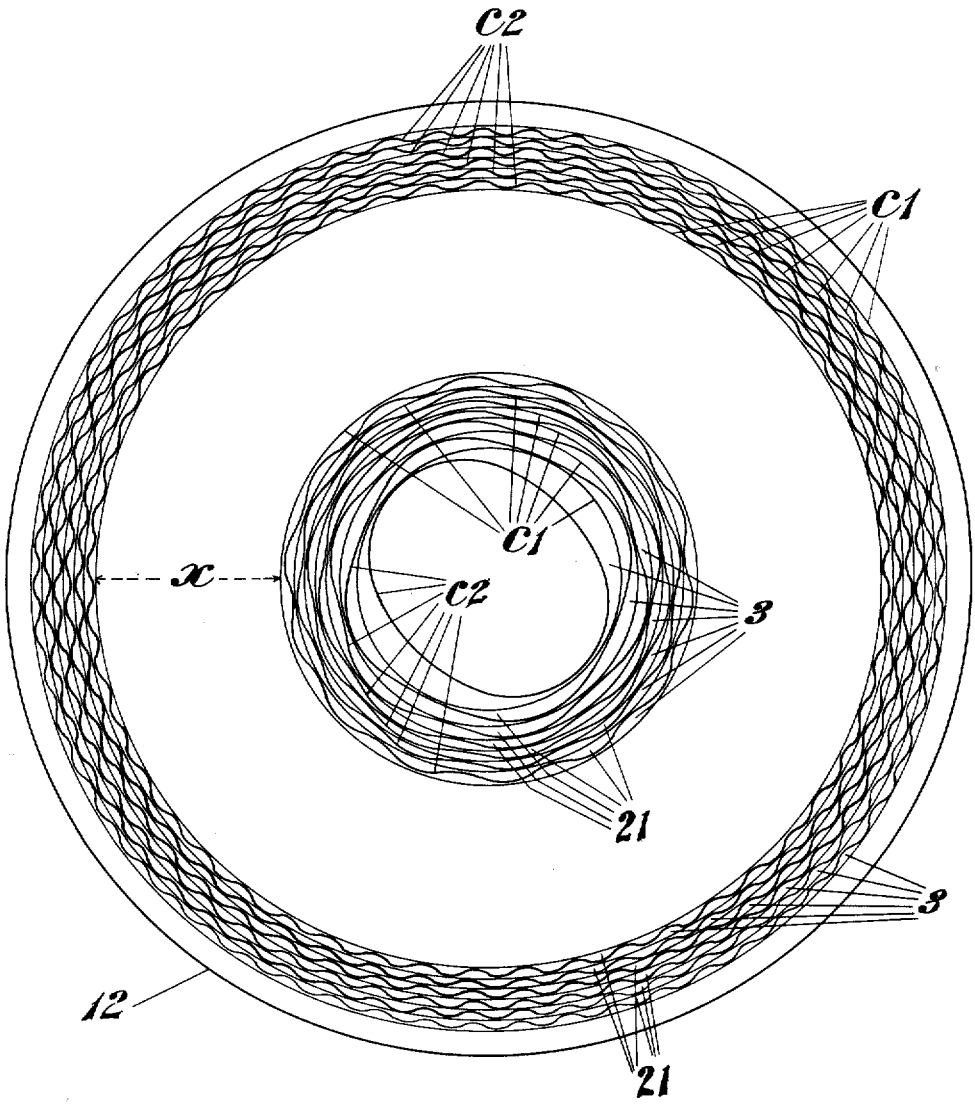
Fig. 6 is a plan of the portion of the generator unit which carries the primary elements.

For the avoidance of confusion, only enough of the cuts $C^1$ and $C^2$ have been shown in Fig. 6 to show the inner seven and the outer six of the rings 3, actually the whole space X will be filled with the cuts $C^1$ and $C^2$.

What I claim and desire to secure by Letters Patent is:—

1. An electrical musical instrument comprising a group of primary elements consisting of coaxial circular rings of undulating formation, means for selectively electrically charging said primary elements, a common secondary element for said coaxial primary elements, means for rotating said secondary element about the center of said primary elements, whereby undulating potentials corresponding to the undulating formation of the primary elements are electrostatically induced in said secondary elements, and means connected to said secondary element responsive to the undulating potentials electrostatically induced therein for generating musical notes of pitch corresponding to the frequencies of undulation.

2. An electrical musical instrument comprising a plurality of groups of primary elements, each group comprising a plurality of coaxial circular rings of undulating formation, means for selectively electrically charging said primary elements, common secondary elements one for each group of coaxial primary elements, means for rotating each of said secondary elements about the center of the corresponding group of primary elements, whereby undulating potentials corresponding to the undulating formation of the primary elements are electrostatically induced in said secondary elements, and means connected to all of said secondary elements responsive to the undulating potentials electrostatically induced therein for generating musical notes of pitch corresponding to the frequencies of undulation.

3. An electrical musical instrument comprising an insulating pitch, a layer of graphite on said base, said graphite being divided to form a plurality of coaxial rings of undulating formations, means for selectively electrically charging said rings, a secondary element in proximity to said rings about the common axis thereof whereby undulating potentials corresponding to the undulating formations of the charged rings are electrostatically induced in said secondary element, and means connected to said secondary element responsive to the undulating potentials electrostatically induced therein for generating musical notes of pitch corresponding to the frequencies of undulation.

4. An electrical musical instrument comprising an insulation base, a layer of graphite on said base, said layer having therein a plurality of alternate coaxial circular and undulating layers of division, thereby forming a plurality of coaxial rings of graphite of undulating formation, means for grounding alternate of said coaxial rings, and means for selectively electrically charging the remainder of said rings, a secondary element common to said rings, means for rotating said secondary element in proximity to said rings about the common axis thereof whereby undulating potentials corresponding to the undulating formations of the charged rings are electrostatically induced in said secondary element, and means connected to said secondary element responsive to undulating potentials electrostatically induced therein for generating musical notes of pitch corresponding to the frequencies of undulation.

5. An electrical musical instrument comprising a member having a plurality of individual electrodes a second member forming a common electrode, said common electrode meber being in juxtaposition to the first named member, means for rotating one of said members with reference to the other, said individual electrodes cooperating with said common electrode to form complementary parts of electrostatic generators to induce undulating potentials by one of said members in the other, sound producing apparatus influenced by said electrostatically induced undulating potentials of the several generators to produce musical notes corresponding to said undulating potentials, and means whereby the charging of said generators may be selectively determined at will.

6. An electrical musical instrument comprising a member having a plurality of individual electrodes, a second member forming a common electrode, said common electrode member being in juxtaposition to the first named member, means for rotating one of said members with reference to the other, said individual electrodes being of relatively different undulating form, said individual electrodes cooperating with said common electrode to form complementary parts of electrostatic generators to induce undulating potentials by one of said members in the other, amplifying means subjected to the electrostatically induced undulating potentials of said generators, and sound producing apparatus responsive to said amplifying means for producing musical notes corresponding to the respective undulations of said individual electrodes, and means whereby the charging of said generators may be selectively determined at will.

7. An electrical musical instrument comprising a plurality of members, each of said members having individual electrodes, a plurality of members each forming a common electrode, said common electrodes being in juxtaposition to the individual electrodes of said first named members respectively, means for rotating each of said members with reference to another of said members respectively, said individual electrodes being of relatively different undulating form, said individual electrodes of each of said first named members cooperating with its respective common electrode to form complementary parts of electrostatic generators to induce undulating potentials by one of said members in the other, electrically operated sound producing apparatus influenced by said electrostatically induced undulating potentials of the several generators of all the respectively cooperating members to produce musical notes corresponding to the respective undulations of said individual electrodes, and means whereby the charging of said generators of the respective cooperating members may be selectively determined at will.

8. The combination of claim 7 and wherein the individual electrodes of each member cooperating with its respective common electrode are formed to generate the octaves and partials of one note, and wherein the respective cooperating members are similar and the speed of relative rotation of each being $$12\sqrt{2}$$

times that of the preceding cooperating members.

LESLIE EDWIN ALEXANDER BOURN.